Aug. 20, 1968    G. P. McCANN ET AL    3,397,870
CARBONATOR TANK
Filed Aug. 19, 1966
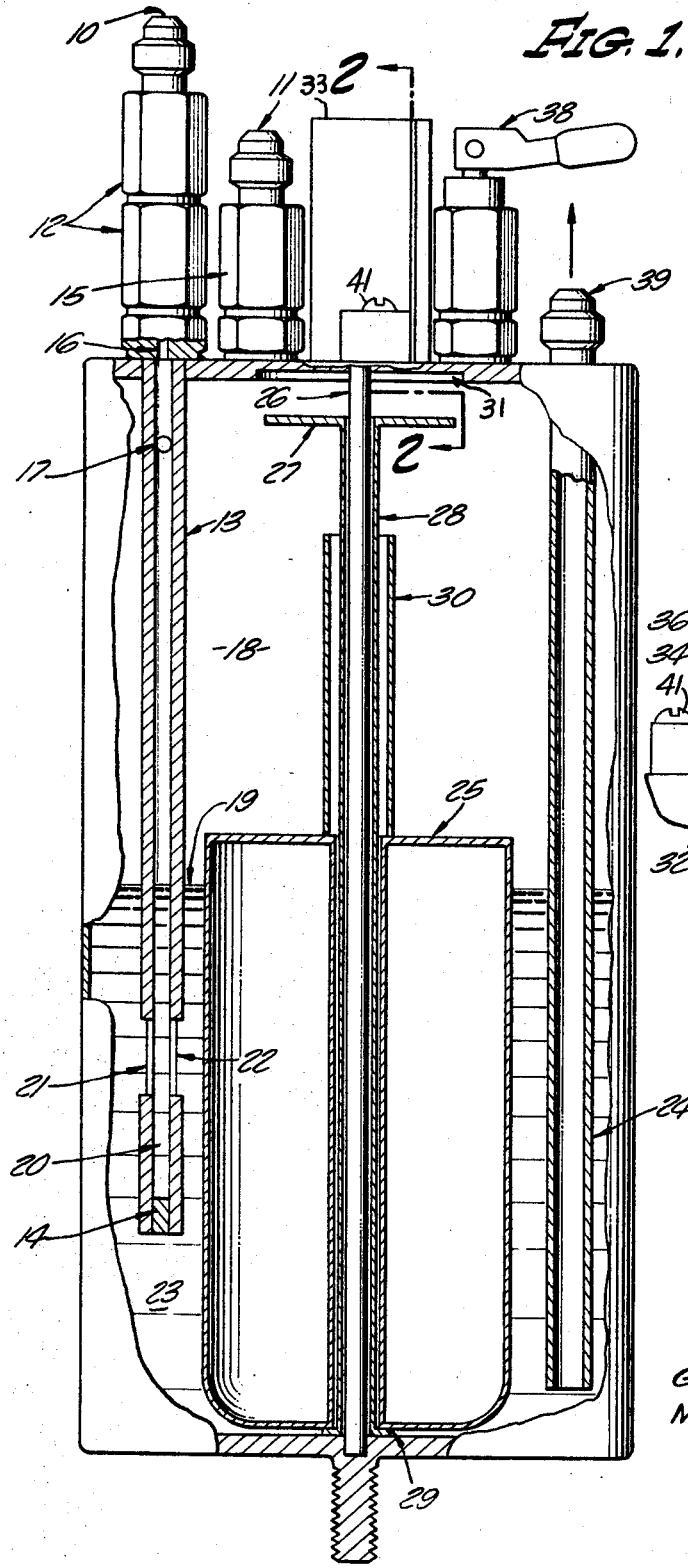
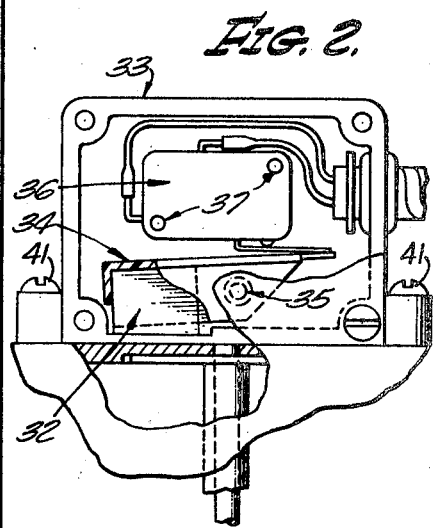
INVENTORS,
GERALD P. McCANN,
MYRON CATON
BY *Lyon & Lyon*
ATTORNEYS – # United States Patent Office 3,397,870
Patented Aug. 20, 1968

3,397,870
CARBONATOR TANK
Gerald P. McCann, Glendale, and Myron Caton, Mission Hills, Calif., assignors to McCann's Engineering & Mfg. Co., Glendale, Calif., a corporation of California
Filed Aug. 19, 1966, Ser. No. 573,643
4 Claims. (Cl. 261—19)

ABSTRACT OF THE DISCLOSURE

A device for impregnating water with carbon dioxide which includes a gas-water mixing means which carbonates the water through a combined venturi action followed by increased mixing and bubbling of the gas through the water in the tank; the unit further including a float means which actuates a control means to control the introduction of water into the tank so that the level is maintained between desired maximum and minimum levels.

Description

This invention relates to the art of carbonation and more specifically to an improved carbonator tank.

The principal object of the invention is to provide such a carbonator tank wherein the carbonation process is carried out in an extremely efficient manner.

It is another object of the invention to provide such a carbonator tank wherein the chance of leakage is eliminated.

It is a further object of the invention to provide such a carbonator tank which prevents producing an excessively foamy drink.

It is another object of the invention to provide a carbonator tank whereby the external actuating device may be both quickly and easily removed and serviced.

It is another object of the invention to provide such a carbonator tank which has no external tubes or sections which could affect the function of the tank by hitting or denting it while in the process of working with the fittings on the top of the tank.

These and other objects will be apparent in the course of the description of the invention which follows.

In the drawings:

FIGURE 1 is a side elevation view of the carbonator tank partially in section.

FIGURE 2 is a view taken along the line 2—2 in FIGURE 1.

Referring to FIGURE 1, the carbonator tank of the present invention is seen to consist of a water inlet 10 and gas inlet 11. The inlet water passes through a double deck valve 12 which consists of two single check valves in series. Each check valve consisting of a steel ball supported by a spring against a rubber seat. The inlet water continues into the water inlet tube 13 which is sealed at the lower end with a plug 14. The $CO_2$ enters the tank through a single check valve 15. $CO_2$ continues to enter the tank until the pressure in the tank equals that of the supply source (maximum of 150 p.s.i.). Due to the size of the orifice in the base of the water inlet check valve 16 the velocity of the water is greatly increased as it enters the water inlet tube 13. In the upper section of this water inlet tube, a hole 17 has been positioned. As the high velocity water rushes past this hole, a venturi action is created which pulls or sucks the $CO_2$ present in the tank 18 into the inlet tube. As the $CO_2$ is pulled into the tube, carbonation which is the act of impregnating water with $CO_2$ occurs. This mixture of $CO_2$ and water carbonates as it continues down the water inlet tube. Upon striking the soda water level 19 in the tank, the mixture explodes or rather breaks up, creating a turbulence, consisting of the trapped $CO_2$ in this small confined area and water molecules created by the velocity of the water. This now highly carbonated water proceeds down the tube where after cushioning against the water confined in the lower end of the tube 20 is jetted out the vertical slots 21 in the tube 13 to be exposed to already highly carbonated water. At this time the trapped $CO_2$ gas from the tube is again permitted to mix with the finished carbonated water by bubbling all through it thus aiding in additional carbonation. The placement of the tube 13 and the manner in which the slots are placed for the water outlet from 22 into the carbonated water area 23 makes it impossible to get gas bubbles over to the bottom of the soda outlet drawn tube 24 which could result in an excessively foamy product.

As the carbonated water is removed from the tank through the soda outlet fitting 39, the float 25 starts to drop. As the float drops it reaches a position where it rests on the washer 29 on the bottom of the water level control tube 28. The float remains in this position until the water level in the tank lowers sufficiently to a point where the float attains 80% of the total weight. At this time the float is heavy enough to pull the actuating plate 27 out of the field of magnetism created by the magnet (in the electrical case 33).

In the embodiment shown in FIGURE 1, the float 25 is designed so that it is solid over the entire length and welded at the top. There is no standard center bead nor any other rough edges or sharp corners which, when submerged would tend to reduce carbonation by creating friction on the soda water thus separating the $CO_2$ from the water. A support shaft 26 is provided to hold the float in the center of the tank while allowing movement in the vertical plane. The shaft also adds strength to the structure.

An actuator 27, which as shown here consists of a stainless steel disc, is fastened to the water level control tube 28 which in turn fits freely over the center shaft 26, goes through the center of the float 25, and has a washer 29 which fits over the control tube and is welded to it. Around the water level control tube is a spacer 30 which is not attached to the float, and so can move freely over the control tube. As the water level changes and causes the float to move up and down, this spacer travels accordingly about the water level control tube 28. As the water level rises, this spacer 30 will make contact with the actuator 27. As the water level continues to rise, the actuator will seat in the upper portion of the top plate 31. This creates an attraction for the magnet 32 contained in electrical case 33, as seen in FIGURE 2. As the actuating plate 27 enters this magnetic field, it causes the magnet bracket 34 to pivot on the non-magnetic pin 35 to a position where it is flat with the bottom of the case. In this position the rear of the magnet bracket 34 pushes against the arm of the micro switch 36 which is held in position by two bosses 37. The micro switch in turn acts to shut off the source of water input into the tank. With this mechanism it is seen that the length of the spacer 30 acts as a pressure regulator. Should the possibility arise that this actuating mechanism malfunctions, a bleeder valve 38 is provided to exhaust the gas in the tank to the atmosphere, thus relieving the pressure build up in the tank. The electrical case 33 is affixed to the top of the tank by suitable fastening means such as the screws 41 so that the entire electrical control means may be quickly and easily removed for maintenance.

The magnetic disc 27 presently being used is made of conventional type 430 F stainless steel and when it moves upwardly within the field of magnet 32 it causes the end of magnet 32 to pivot downwardly and rotate about the pin 35 whereupon the opposite end of bracket 34 actuates the micro switch 36. When the actuating disc 27 moves downwardly as the float drops, the disc 27 moves out of the magnetic field set up by magnet 32 and allows it to pivot in the opposite direction. Micro switches of ordinary design are employed for the micro switch 36 and they normally include a small spring on the actuating button thereof and it is this spring which is forced against the switch arm, also of ordinary design, as shown in FIGURE 2, which causes the bracket 34 and magnet 32 to pivot in a clockwise direction. Thus, the force of the normal spring found in micro switches is sufficient to return the switch to a non-actuated condition when the magnet 32 has not been attracted to a downward position. As stated previously the micro switch is connected to a means for shutting off the source of water input into the tank and this may be a connection to a pump motor or to a solenoid shutoff valve as desired. It is not felt to be necessary to illustrate to what the micro switch should be connected since it is deemed obvious that if it is to be used to shut off the water the means to be employed for such purpose are well known in the art.

As the carbonated water is removed from the tank through the soda outlet fitting 39, the float starts to drop. As the float drops, it reaches a position where it rests on the washer 29 on the bottom of the water level control tube 28. The float remains in this position until the water level in the tank lowers sufficiently to a point where its buoyant force supports only 20% of the weight of the float. At this time the float is heavy enough to pull the actuating plate 27 out of the magnetic field created by the magnet 32 in the electrical case 33, and so the flow of water into the tank resumes.

While the specific details of the invention have been herein shown and described, changes and alterations may be resorted to without departing from the spirit thereof as defined in the appended claims.

We claim:
1. A carbonator device of the type having a receiving chamber, a water inlet, a gas inlet, and a mixture outlet, the improvement comprising: means for controlling the introduction of gas and water through said inlets into the receiving chamber, a float mechanism, means provided on said float mechanism for operating said control means, wherein said means comprise: a plate for activating said control means, a first tube connected to said plate, a second tube connected to said float circumscribing said first tube, a support shaft through said plate and said tubes connected at its upper and lower ends to said receiving chamber, whereby as said float rises, said second tube engages said plate, said plate rises and at a predetermined water level activates said control means preventing further entrance of water into said receiving chamber.

2. A carbonator device of the type having a receiving chamber, a water inlet, a gas inlet, and a mixture outlet, the improvement comprising: means for controlling the introduction of gas and water through said inlets into the receiving chamber, a float mechanism, means provided on said float mechanism for operating said control means, wherein said means comprises: a plate for activating said control means, a first tube connected to said plate, a second tube connected to said float circumscribing said first tube, a support shaft through said plate and said tubes connected at its upper and lower ends to the receiving chamber, whereby as said float rises, said second tube engages said plate, said plate rises and at a predetermined water level activates said control means preventing further entrance of water into said receiving chamber, a mixing tube having an upper end and a lower end extending from the water inlet into the receiving chamber, said tube having an orifice near its upper end for inducing a venturi action to controllably introduce the gas into said tube to produce a gas-water mixture, means for sealing said lower end of said tube whereby said gas and water mixture impacts against said sealing means, said tube having at least one vertical slot near its lower end for introducing said mixture into said receiving chamber.

3. The combination of claim 2 wherein said control means comprises: a micro switch controlling the introduction of water into said receiving chamber, magnetic means operable in the vertical plane to actuate said micro switch, a housing constructed of non magnetic material, fastening means permitting rapid separation of said housing from said carbonator device.

4. A carbonator device of the type having a receiving chamber, a water inlet, a gas inlet, and a mixture outlet, the improvement comprising: means for controlling the introduction of gas and water through said inlets into the receiving chamber, said control means being exterior of said receiving chamber, float means operable to actuate said control means in response to water reaching a predetermined level to prevent further entrance of water into said receiving chamber, a mixing tube having an upper end and a lower end extending from the water inlet into the receiving chamber, said tube having an orifice near its upper end for inducing a venturi action to controllably introduce the gas into said tube to produce a gas-water mixture, said tube having at least one perforation near its lower end for introducing said mixture into said receiving chamber; means on said float for operating said control mechanism, said means comprising a plate for actuating said control means, a first tube connected to said plate, a second tube connected to said float circumscribing said first tube, a support shaft through said plate and said tubes connected at its upper and lower ends to the receiving chamber, whereby as said float rises, said second tube engages said plate, said plate rises and actuates sid control means.

References Cited
UNITED STATES PATENTS

| | | |
|---|---|---|
| 2,148,902 | 2/1939 | Everson. |
| 2,300,300 | 10/1942 | Lund. |
| 2,339,640 | 1/1944 | Holinger. |
| 2,414,607 | 1/1947 | Phillips. |
| 2,420,795 | 5/1947 | Phillips _____ 261—76 |
| 2,564,655 | 8/1951 | Binford _____ 200—84 X |
| 3,293,579 | 2/1966 | Harper _____ 200—84 X |

RONALD R. WEAVER, *Primary Examiner*.